United States Patent
Sülzle

(10) Patent No.: US 10,202,078 B2
(45) Date of Patent: Feb. 12, 2019

(54) REAR-VIEW DEVICE WITH VIBRATION DAMPING

(71) Applicant: SMR Patents S.à.r.l., Luxembourg (LU)

(72) Inventor: Bernd Sülzle, Nürtingen (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 15/527,606

(22) PCT Filed: Nov. 13, 2015

(86) PCT No.: PCT/IB2015/058776
§ 371 (c)(1),
(2) Date: May 17, 2017

(87) PCT Pub. No.: WO2016/079645
PCT Pub. Date: May 26, 2016

(65) Prior Publication Data
US 2017/0320438 A1   Nov. 9, 2017

(30) Foreign Application Priority Data
Nov. 17, 2014  (DE) .................. 10 2014 116 799

(51) Int. Cl.
*G02B 26/08*   (2006.01)
*B60R 1/072*   (2006.01)
(Continued)

(52) U.S. Cl.
CPC ................ *B60R 1/072* (2013.01); *B60R 1/06* (2013.01); *B60R 1/0602* (2013.01); *F16F 7/1028* (2013.01); *B60R 2001/1253* (2013.01)

(58) Field of Classification Search
CPC .......... B60R 1/025; B60R 1/081; B60R 1/072; B60R 2001/1253; F16F 7/1028
(Continued)

(56) References Cited

U.S. PATENT DOCUMENTS 6,485,155 B1 * 11/2002 Duroux ................. B60R 1/07
359/843
2003/0122930 A1   7/2003 Schofield et al.
(Continued)

FOREIGN PATENT DOCUMENTS

| DE | 102005055849 A1 | 5/2007 |
|----|----|----|
| EP | 0388988 A1 | 9/1990 |
| FR | 2945246 A1 | 11/2010 |

OTHER PUBLICATIONS

International Search Report dated Jan. 21, 2016, in corresponding International Application No. PCT/IB2015/058776.

*Primary Examiner* — Euncha Cherry
(74) *Attorney, Agent, or Firm* — Jones Day

(57) ABSTRACT

A rear-view device for a motor vehicle with vibration damping, includes at least one rear-view element which is mounted in a housing in an adjustable manner relative to the housing via an adjusting drive, where the adjusting drive includes at least one motor which can be adjusted via a control or regulating device in order to adjust the field of view, and the control or regulating device controls or regulates the motor via the energizing process of the motor depending on at least one variable, which is selected from a first detected variable and/or at least one second stored variable, during a driving process in order to counteract movements of the at least one rear-view element relative to the housing by adjusting the motor, said movements being caused in particular by the movements of the motor vehicle during the driving process of the motor vehicle.

16 Claims, 1 Drawing Sheet

(51) Int. Cl.
  *B60R 1/06* (2006.01)
  *F16F 7/10* (2006.01)
  *B60R 1/12* (2006.01)
(58) Field of Classification Search
  USPC .............................................. 359/217.3, 843
  See application file for complete search history.

(56) References Cited

U.S. PATENT DOCUMENTS

2004/0184169 A1    9/2004  Newcomb
2005/0111117 A1*   5/2005  Qualich .................. B60R 1/025
                                                    359/843

* cited by examiner

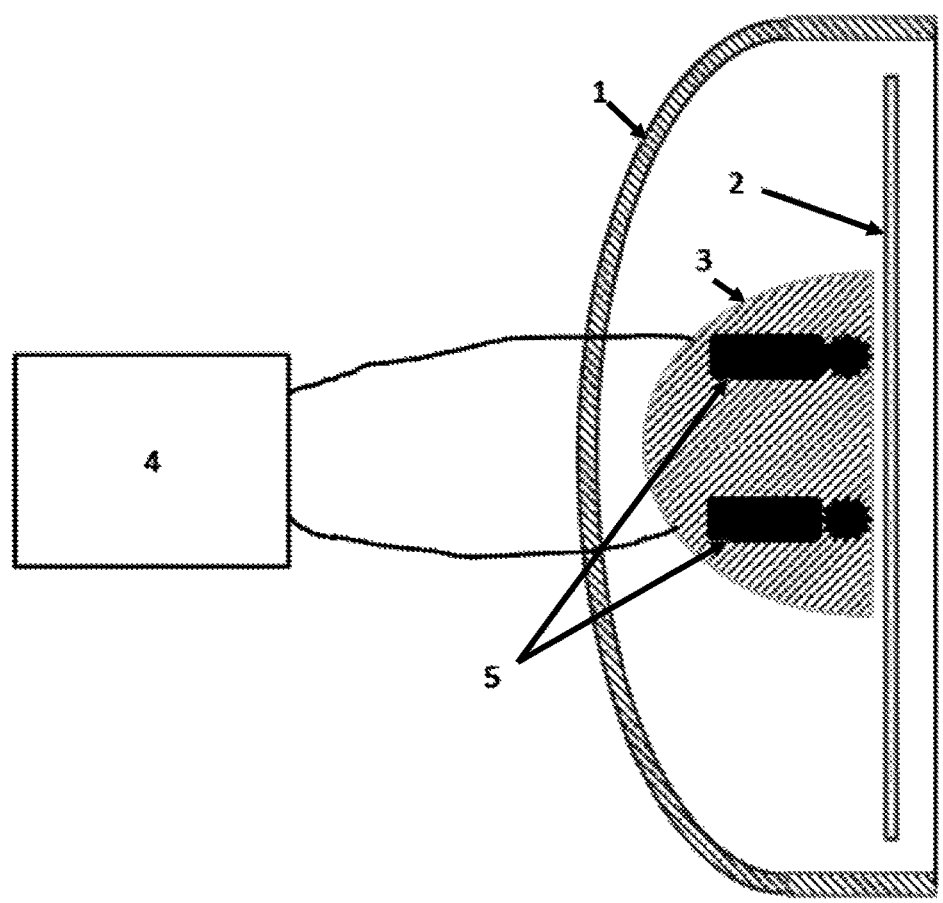

REAR-VIEW DEVICE WITH VIBRATION DAMPING

CROSS-REFERENCE TO RELATED APPLICATIONS

This application is a national stage entry of International Patent Application No. PCT/IB2015/058776, filed Nov. 13, 2015, which claims the benefit of German Patent Application No. 10 2014 116 799.6, filed Nov. 17, 2014, the disclosure of each of which is incorporated herein by reference in its entirety.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The following description relates to a rear-view device for a motor vehicle with vibration damping, including at least one rear-view element which is mounted in a housing in an adjustable manner relative to the housing via an adjusting drive, wherein the adjusting drive includes at least one motor which can be adjusted via a control or regulating device in order to adjust the field of view.

2. Description of Related Art

A typical rear-view device is, for example, known from DE 25 21 718 A1. In this case, a fixed motor drives a worm that is angularly movable through a flexible coupling into selective engagement with one of two nuts to drive adjusting screws that cause a mirror element to pivot about one of two mutually perpendicular axes. The screws and pivot structure for the mirror element are integrally formed as part of a mirror supporting plate. The nuts are yieldably coupled to the threads of the adjusting screws to permit slippage between the two when forces exceed the wormed driving forces. Operating noise is reduced by a vibration-damping motor mounting and by a structure limiting worm engagement with the nuts. Projections are carried by the mirror supporting plate resiliently biased against a fixed support to reduce vibration.

Up to now, it has been standard practice to use additional passive or active components, which have to be mounted in a suitable manner on mirror components such as a supporting plate or a housing part, in order to dampen vibrations in a rear-view device for a motor vehicle, for instance in the form of a car's external mirror.

DE 10 2005 055 849 A1 relates to a method for damping of vibrations, caused by the operation of a motor vehicle and/or engine of a motor vehicle and/or by external influences on the mirror glass of a rear-view mirror of the motor vehicle, in which the transmitted vibrations are dynamically compensated or statically suppressed as far as possible by means of at least one actuator which can be electrically activated and which acts directly on the mirror glass or an adjoining component and which can be selectively controlled. The at least one actuator which can be electrically activated can thereby be simultaneously used as a drive for making the basic adjustments to the mirror glass which have to be made occasionally.

SUMMARY

An aspect of the invention is to further develop the generic rear-view device such that additional components for damping vibrations are avoided at the same time as making it simpler to adjust each motor.

For example, this aspect is achieved in that the control or regulating device controls or regulates the motor via the energizing process of the motor depending on at least one variable, which is selected from a first detected variable and/or at least one second stored variable, during a driving process in order to counteract movements of the at least one rear-view element relative to the housing by adjusting the motor, said movements being caused in particular by the movements of the motor vehicle during the driving process of the motor vehicle.

It can thereby be envisaged that the at least one rear-view element comprises a mirror element and/or an image acquisition element, in particular in the form of a camera, wherein the image acquisition element preferably acts as a mirror replacement element.

It is also proposed with the invention that the first detected variable is detected via a sensing device, and/or the first detected variable is determined via the driving process of the motor vehicle, preferably the speed of the motor vehicle, the engine speed of the motor vehicle motor and/or the lane of the motor vehicle, and/or the weather during the driving process, preferably a wind force, and/or at least one obstacle which is to be avoided.

It is furthermore proposed that the second stored variable originates from a storage device in the rear-view device or in the motor vehicle or in a mobile unit, and/or the second stored variable is determined via a map.

It can also be envisaged that the control or regulating device adjusts the energizing process via current pulses, in particular with frequency-dependent pole reversal, or the current intensity of a permanent current.

It is additionally preferred that the adjusting drive comprises two motors in order to adjust the field of view and to dampen vibrations.

According to an aspect of the invention, a shock absorbing device can be provided for the at least one rear-view element, preferably in operative connection with the control or regulating device, each motor, the sensing device and/or the storage device.

Rear-view devices according to the invention can be characterized in that the mirror element covers a first viewing zone and the image acquisition element covers a second viewing zone, and/or 2 mirror elements or 2 image acquisition elements are provided for a first and a second viewing zone, wherein the first viewing zone preferably constitutes a near viewing zone and the second viewing zone constitutes a distance viewing zone.

According to an aspect of the invention, it is further preferred that the housing comprises a first housing element and a second housing element which can be moved, in particular can be folded, relative thereto, wherein the at least one rear-view element is preferably arranged in the second housing element and the first housing element is mounted on the motor vehicle.

It can thereby be envisaged that a pivoting device, which is preferably in operative connection with the control or regulating device, each motor, the sensing device, the storage device and/or the impact absorbing device, is arranged between the first and the second housing element.

According to an aspect of the invention, vibration damping and, therefore, stabilization e.g. of a mirror glass element in particular of a car's external mirror are effected via the adjusting drives/glass adjusters (usually available on the automotive supply market) with two drive motors which have hitherto been exclusively used for adjusting the field of view. These drive motors are namely allocated the additional function of substantially compensating in full for movements/oscillations during the driving process and, indeed, by means of a specific energizing process. This energizing process can be intelligently adjusted depending on the speed of the car, the engine speed of the car motor, the lane along which the car is moving during the driving process, and/or weather conditions during the driving process. Recourse can be had to GPS information regarding curves, gradients and the like during the lane determination. The same applies to weather information.

In a rear-view device according to the invention, vibration damping of an image acquisition element, which acts as a mirror replacement element and which can therefore also be described as a virtual mirror element, can be effected, instead of a mirror (glass) element, or in addition to the vibration damping of the mirror (glass) element. This increases the range of application and thus the flexibility.

Additional features and advantages of the invention are set out in the following description, in which an embodiment example of the invention is explained by way of example with reference to a schematic drawing consisting of a single FIGURE, wherein:

BRIEF DESCRIPTION OF THE SEVERAL VIEWS OF THE DRAWINGS

Further design examples are explained with reference to the attached schematic drawings. They show:

FIG. 1 illustrates a sectional view through a rear-view device according to the invention.

DETAILED DESCRIPTION OF THE INVENTION

A rear-view device according to the invention comprises a mirror housing 1 which is fixed to a vehicle (not shown), in which mirror housing a mirror glass 2 can be adjusted relative to the mirror housing 2 via a glass adjusting drive 3. For this purpose, two drive motors 5 can be adjusted via control electronics 4.

The drive motors 5 are used, on the one hand, in order to set the field of view for a driver or passenger of the vehicle. On the other hand, they serve to stabilize the mirror glass. A specific speed-dependent or engine speed-dependent energizing process of the two drive motors 5 can namely be used via the control electronics 4 to dampen the movement and/or vibration of the mirror glass 2 perceived by eye during the driving process of the vehicle, without adjusting the field of view. More precisely, the energizing process of the two drive motors 5 can be carried out by current pulses with frequency-dependent pole reversal or by means of a permanent current which is limited in terms of its current intensity such that the set field of view is not adjusted, but a mirror image which is free of vibrations for the human eye is produced on the mirror glass 2.

At least one advantage of the invention is therefore that an active damping of the mirror glass 2 can be achieved with active components which already exist in the glass adjusting drive 3 and that no additional active or passive components have to be mounted in any way on mirror components.

The features of the invention disclosed in the preceding description, the claims and drawing can be essential, both individually and in any combination, for realizing the invention in its various embodiments.

LIST OF REFERENCE NUMERALS

1 Mirror housing
2 Mirror glass
3 Glass adjusting drive
4 Regulating electronics
5 Drive motor

The invention claimed is:

1. A rear-view device for a motor vehicle configured to provide vibration dampening, comprising:
    a housing;
    an adjusting drive comprising at least one motor which is configured to be adjusted via a control unit, and
    at least one rear-view element which is mounted in the housing in an adjustable manner relative to the housing via the adjusting drive,
    wherein the adjusting drive is configured to be adjusted via the control unit in order to adjust a field of view of the rear-view element, and
    the control unit controls the motor by energizing the motor depending on at least one variable, which is selected from at least one first detected variable or at least one second stored variable, during a driving process in order to counteract vibration of the at least one rear-view element without changing the field of view.

2. The rear-view device according to claim 1, wherein the at least one rear-view element comprises at least one of a mirror element and an image acquisition element.

3. The rear-view device according to claim 2, wherein the image acquisition element comprises a camera, which is suited to acts as a mirror replacement element.

4. The rear-view device according to claim 1, wherein:
    the first detected variable is detected via a sensing device, and
    the first detected variable is determined via at least one of
        the driving process of the motor vehicle, preferably the speed of the motor vehicle, the engine speed of the motor vehicle motor and/or the lane of the motor vehicle, and
        the weather during the driving process, preferably a wind force, and
        at least one obstacle which is to be avoided.

5. The rear-view device according to claim 1, wherein the second stored variable originates from a storage device in the rear-view device or in the motor vehicle or in a mobile unit.

6. The rear-view device according to claim 1, wherein the second stored variable is determined via a map.

7. The rear-view device according to claim 1, wherein the control unit adjusts the energizing process via current pulses or the current intensity of a permanent current.

8. The rear-view device according to claim 1, wherein the adjusting drive comprises two motors in order to adjust the field of view and to dampen vibrations.

9. The rear-view device according to claim 1, wherein a shock absorbing device for the at least one rear-view element, in operative connection with the control unit and at least one of each motor, the sensing device and the storage device.

10. The rear-view device according to claim 1, wherein
the mirror element covers a first viewing zone and the image acquisition element covers a second viewing zone, or
two mirror elements or two image acquisition elements are provided for a first and a second viewing zone.

11. The rear-view device according to claim 10, wherein the first viewing zone constitutes a near viewing zone and the second viewing zone constitutes a distance viewing zone.

12. The rear-view device according to claim 1, wherein the housing comprises a first housing element and a second housing element which is configured to be moved relative thereto.

13. The rear-view device according to claim 12, wherein a pivoting device, which is in operative connection with the control unit and at least one of each motor, the sensing device, the storage device and the impact absorbing device, is arranged between the first and the second housing element.

14. A rear-view device for a motor vehicle configured to provide vibration dampening, comprising:
a housing;
an adjusting drive comprising at least one motor which is configured to be adjusted via a control unit, and
at least one rear-view element which is mounted in the housing in an adjustable manner relative to the housing via the adjusting drive,
wherein the adjusting drive is configured to be adjusted via the control unit in order to adjust a field of view of the rear-view element, and
the control unit controls the motor by energizing the motor depending on at least one variable, which is determined during a driving process of the motor vehicle in order to counteract vibration of the at least one rear-view element without changing the field of view.

15. A rear-view device for a motor vehicle configured to provide vibration dampening, comprising:
a housing;
an adjusting drive comprising at least one motor which is configured to be adjusted via a control unit; and
at least one rear-view element which is mounted in the housing in an adjustable manner relative to the housing via the adjusting drive,
wherein the adjusting drive is configured to be adjusted via the control unit in order to adjust a field of view of the rear-view element, and
the control unit controls the motor by energizing the motor depending on at least one variable during a driving process in order to counteract vibration of the at least one rear-view element relative to the housing without changing the field of view by adjusting the motor.

16. A rear-view device for a motor vehicle configured to provide vibration dampening, comprising:
a housing;
an adjusting drive comprising at least one motor which is configured to be adjusted via a control unit; and
at least one rear-view element which is mounted in the housing, with the housing comprising a first housing element and a second housing element which is configured to be moved relative thereto,
wherein the at least one rear-view element is mounted in an adjustable manner relative to at least one of the first and second housing elements via the adjusting drive, and
the control unit controls the motor by energizing the motor depending on at least one variable during a driving process in order to counteract vibration of the at least one rear-view element relative to the housing without changing the field of view by adjusting the motor.

* * * * *